No. 684,647. Patented Oct. 15, 1901.
H. P. MADSEN.
MEANS FOR PLUGGING PNEUMATIC TIRES.
(Application filed July 17, 1901.)
(No Model.)

WITNESSES:
A. R. Appleman
George H. O. Crist

INVENTOR
Hans P. Madsen
BY
Thomas Drew Stetson
ATTORNEY

THE NORRIS PETERS CO., PHOTO-LITHO., WASHINGTON, D. C.

UNITED STATES PATENT OFFICE.

HANS PETER MADSEN, OF NEW YORK, N. Y.

MEANS FOR PLUGGING PNEUMATIC TIRES.

SPECIFICATION forming part of Letters Patent No. 684,647, dated October 15, 1901.

Application filed July 17, 1901. Serial No. 68,570. (No model.)

*To all whom it may concern:*

Be it known that I, HANS PETER MADSEN, residing in the borough of Manhattan, in the city and State of New York, have invented a certain new and useful Improvement in Means for Plugging Pneumatic Tires; and I do hereby declare that the following is a full and exact description thereof.

I will describe the invention as applied to the closing of a small leak in an ordinary bicycle-tire. I employ peculiar tools and a peculiar method. I make the hole larger and insert a previously-prepared plug of rubber having a larger head and so operate that later when the job is completed the head of the plug lies inside of the tire and the head and shank of the plug are tightly joined to the tire by cement. This general method of operating has been long known and approved.

I have improved the method and have devised a peculiar form of the plug and peculiar tools for operating, all of which will be enumerated in the claims.

The following is a description of what I consider the best means of carrying out the invention.

The accompanying drawings form a part of this specification.

Figure 1:
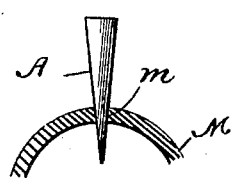
Figure 2:
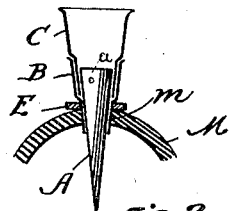
Figure 3:
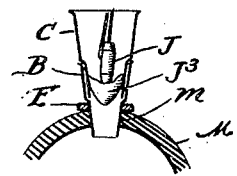
Figure 4:
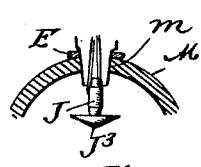
Figure 5:
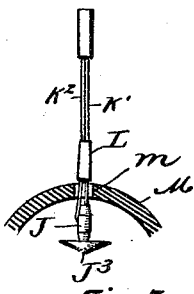
Figure 6:
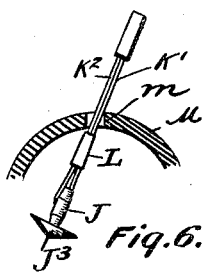
Figure 7:
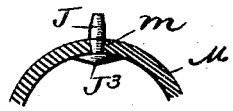
Figure 8:
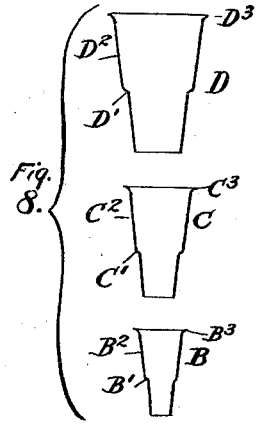
Figure 11:
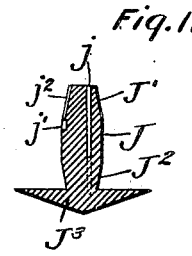
Figure 12:
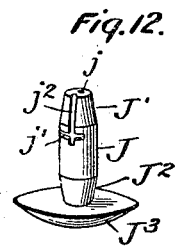
Figure 10:
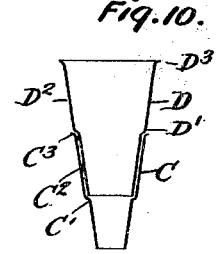
Figure 13:
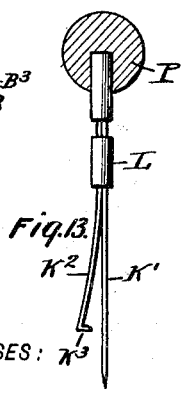
Figure 15:
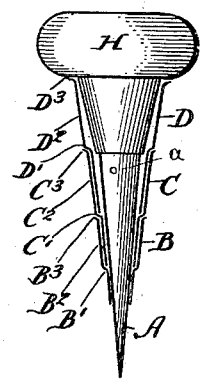
Figures 9, 14:
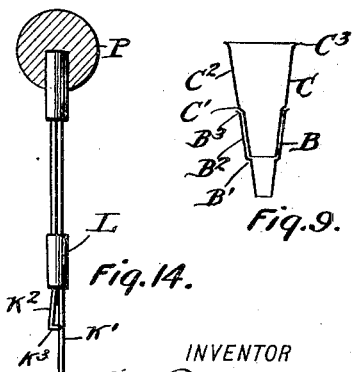

Figures 1 to 7, inclusive, are corresponding cross-sections through the tire in the plane of the puncture, showing successive stages. Fig. 1 show, the puncture in the act of being enlarged. Fig. 2 shows the same after the hole has been enlarged, the parts arranged, and the thimbles entered; Fig. 3, the same with the hole-burner removed and the plug partially inserted in the now clear space within the thimbles. Fig. 4 shows the plug in the interior of the tire. Fig. 5 shows the same after the thimbles have been removed. Fig. 6 is another view showing the same condition, but with the plug being tilted. Fig. 7 shows the same after the plug has been drawn up to place. Fig. 8 is on a larger scale. It shows the three thimbles in line, but separated. Fig. 9 is on a corresponding scale showing the two smallest thimbles applied together ready for treating a small hole. Fig. 10 is a corresponding section showing the middle size and largest thimble associated ready for use. Fig. 11 is a central longitudinal section of a plug. Fig. 12 is a perspective view of the plug. Fig. 13 shows my clamp in its open condition. Fig. 14 shows the same in its closed condition. Fig. 15 is a central longitudinal section showing the hole-burner, all the thimbles, and a wood handle applied together for more conveniently burning the hole in the tire.

Similar letters of reference indicate corresponding parts in all the figures where they appear.

M is a pneumatic tire of any ordinary or suitable construction, and $m$ the hole which is to be plugged.

I provide a hollow conical piece of metal A, adapted to perform the two functions of melting or technically "burning" a hole in the tire at the point where a leak is discovered. At a later stage in a cool condition this same piece serves as a pilot for the peculiar thin metal funnel which I introduce in the hole. I will for brevity designate this part A by its first-named function as a "hole-burner."

B C D are short tapering tubes, of hard brass or other suitable material, of different sizes, formed with offsets, as shown, and so proportioned that when two are properly applied together, as shown in Fig. 3, they present a practically continuous and uniform conical interior—that is to say, the large end $B^2$ of the smallest ring is joined to the small portion B of such ring by an offset or sudden contraction B' about equal to the thickness of the metal. Applied together these tapering tubes make one continuous tube. Separated they make short pieces. I will call them "thimbles." The large end $C^2$ of the next larger thimble is joined to the small end C thereof by an offset C', and the large end $D^2$ of the largest thimble is joined to the small end D thereof by an offset D'. I can use these thimbles all three applied together; but it is usually sufficient to use two. If the hole is small, I use only the smallest and the medium size. If the hole is larger, I use the medium size and the largest, always matching together the two which are used in the same manner in which they are matched together in Fig. 15. I provide the outer end of each thimble with a flange, the outer end of the smallest thimble having a flange $B^3$, the outer end of the next thimble having a flange $C^3$, and the largest a flange $D^3$. These are useful in pulling out the united thimbles from the tire if such extraction at the proper stage shall require much force.

E is a collar or washer adapted to fit tightly on the small thimble. I provide a corresponding collar (not shown) to similarly match under the offset of the next larger thimble, and so on.

I will describe the invention as applied to plug a hole which is matched by the smallest thimble.

I match two of the thimbles together, and to make the required smoothly-rounded hole where the leak is discovered in the tire I apply the hole-burner A by placing it in the interior of the smallest thimble. A wood handle H being introduced at the large end of the larger thimble to serve as a convenient holder for applying the thrusting force when the metal is hot, I apply the hole-burner A a few times in the heated condition at the desired point in the tire and, either by a simple thrust or by the same combined with a turning motion, rapidly produce a hole of the required size. Now, drawing out the metal parts and laying them aside for the present, I wash the vicinity of the hole $m$ with naphtha, and thus remove the partially-demoralized material which may be remaining there. Now, cooling the parts and changing the position of the hole-burner by taking it off the outside and thrusting it in the inside of the aggregatedt thimbles, I cause it to serve as a pilot in presenting the thimbles to the hole $m$ and by the application of a little force with a turning motion insert the small end B of the thin small thimble. The washer E now performs an important function in preventing any excess of force from thrusting the thimbles too far into the tire. When the thimbles are properly placed with the washer pressed into contact with the exterior of the tire, the internal piece A, which I still call the "hole-burner," although it has last performed a different function, is drawn out axially and removed.

I provide plugs of rubber having general characteristics which have been long known and approved, but differing in several points of importance. The shank J is contracted at the "point," as indicated by $J'$, and also contracted under the head, as indicated by $J^2$. The head $J^3$ may be of the ordinary form. The whole is in one piece of soft rubber. A hole $j$ is produced extending from the point upward toward the head. This hole is considerably one side of the center line. On the fullest side of the shank is a shallow transverse notch $j'$. A corresponding shallow longitudinal groove $j^2$ extends from this notch to the small end.

The provisions for applying the plug may have been made before and will now be described.

$K'$ $K^2$ are the two parts of a wire clamp of tempered steel. The longer arm $K'$ is pointed. The shorter arm $K^2$ is widened and bent sharply inward, as indicated by $K^3$. The bight K is sharply folded. The arms spring apart.

L is a short tapering tube or partially flattened ring adapted to be easily and strongly moved endwise by the fingers. It is slipped on over the folded end K and applies on the arms of the clamp, so that by moving it in one direction or the other it will either strongly compress them together or relax its hold and allow them to spring apart.

To take hold of the plug, the point of the part K is thrust firmly into the hole $j$, and turning the clamp into the right position the claw $K^3$ of the shorter arm $K^2$ is brought to bear on the side of the shank of the plug, so that the main substance of the plug is embraced between the arms of the clamp ready to be strongly engaged. The strong compression induced by the action of the ring causes the claw $K^3$ to be deeply impressed into the side of the shank J. It is to increase this sinking and make the grip still more secure that I provide the plug with the transverse notch $j'$, in which the claw $K^3$ can sink, and the longitudinal groove $j^2$, which can receive the arm $K^2$.

P is a handle which may be applied on the end of the clamp to allow a vigorous thrusting action by the hand when required.

To prepare a plug for insertion into the tire through the passage provided by the thimbles, I smear the entire head $J^3$ and a portion of the adjacent surface of the plug with rubber-cement and when all is ready freshly wet the whole with the solvent and thrust it rapidly through the tapering orifice into the interior of the tube. The condition at the close of this movement is shown, and when this is attained the principal difficulties in the operation are passed. Next after removing the handle P from the clamp the aggregated thimbles B C and the washer E may be drawn out by a sufficiently forcible pull, leaving only a portion of the clamp extending out loosely through the hole $m$. Cement is now applied by a stick or any suitable implement and forced inward more or less regularly through the liberal space remaining in the hole $m$ not filled by the clamp. This should be applied a sufficient number of times and with the clamp inclined in one direction and the other to allow the hole to be liberally filled and a quantity of the semifluid to be accumulated in the interior of the tire adjacent to the hole. Now force is applied by simply clasping the clamp and pulling until the tapered end $J^2$ of the plug emerges, and on the drawing action being continued with more or less turning in one direction and the other the plug is brought firmly to its proper bearing, with the head pressing against the interior of the tire adjacent to the hole with a continuous layer of cement between the parts. Next, either immediately or after a little interval, the slide L is moved to relax the hold and the clamp is drawn out, after which the protuberant portion of the shank J of the plug is cut off by a knife or otherwise and the operation is complete.

The tools may be cleaned by applying naphtha and put away for another operation.

My apparatus and method are well adapted to serve either for those who make a business of bicycle-repairing or, by its construction in small pieces matching together as described, will serve conveniently with a small bottle of cement in the ordinary cyclist's tool-bag.

I attach importance to the thin metal of the hole-burner A, because it adapts it to be heated with facility by the ordinary small lamp carried on the bicycle.

Modifications may be made without departing from the principle or sacrificing the advantages of the invention. The taper of the thimbles and of the hole-burner may be greater or less than shown. It is important to not extend the hole-burner through in making the hole, so as to injure the opposite side of the tire.

Parts of the invention may be used without others. The notch $j'$ and the longitudinal channel $j^2$ may be omitted. So, also, the tapers $J'$ and $J^3$ of the shank of the plug and ordinary plugs, such as are furnished with ordinary bicycle supplies, may be used. In such case the hole $j$ may be produced by the sharp end of the arm $K'$. The eccentric position of the hole may be dispensed with. Care should be taken, whether the hole is produced in the manufacture or afterward, to extend it far enough to properly sustain the plug in the act of being thrust through the contracting passage formed by the thimbles. Something depends on the rigidity of the rubber stock in the plug. If it is very soft, the hole and the introduction of the arm $K'$ therein must be extended farther. When the material will allow it, I prefer to have the hole $j$ so short that the cutting off of the surplus material at the conclusion of the operation will leave the surface of the tire smooth and continuous; but no harm, except to the appearance, will result if the hole extends farther, so as to enter a little farther into the head $J^3$.

The wooden handles H and P may be merely chips picked up on the spot or may be dispensed with altogether.

Although I have described this device with reference only to a tire of the ordinary diameter and thickness for a single bicycle, it will be understood that it may apply also to thicker ones used with tandems and the much larger and heavier tires used with automobiles and other carriages.

I have shown a small hole $a$ in the hole-burner A, which may be useful to allow it to be engaged by a suitable hook or simply a bent wire to pull it out in case it should stick. This is not usually necessary and can be omitted, if preferred.

I claim as my invention—

1. A repair-plug of rubber having a shank J and head $J^3$ with a hole $j$ extending longitudinally of the shank out of the line of the axis, and a transverse notch $j'$ on the opposite side of the shank, adapted to serve as herein specified.

2. A repair-plug of rubber having a shank J tapered at each end and head $J^3$, the shank being provided with a longitudinal hole $j$, out of the line of the axis, and a notch $j'$ and a longitudinal groove $j^2$ on the exterior of the shank on the opposite side adapted to serve as herein specified.

3. In apparatus for plugging pneumatic tires the clamp described comprising a bight K long arm $K'$ a short arm $K^2$ provided with a claw $K^3$ and a slide-ring L adapted to serve substantially as herein specified.

4. In apparatus for plugging tires, in combination with a tapering tube B C D matched together with offsets and collar E applied under the offset of the smallest used, a hollow tapering metal piece A adapted to serve both to produce a hole in the tire at the commencement and to guide the tube at a later stage, substantially as herein specified.

5. In apparatus for plugging tires a tapering tube formed in separable lengths each with a flange on its exterior at the large end an offset at the mid-length and a sharp edge at the small end adapted to be selected and matched together to cut and fit in holes of different sizes, in combination with each other and with a hollow tapering piece A adapted to serve in one relation as a holder for such tapering piece in burning a hole and in another to be guided by such piece in being itself engaged in the hole, all substantially as herein specified.

In testimony that I claim the invention above set forth I affix my signature in presence of two witnesses.

HANS PETER MADSEN.

Witnesses:
THOMAS DREW STETSON,
M. F. BOYLE.